US005601308A

United States Patent [19]
Cuevas

[11] Patent Number: 5,601,308
[45] Date of Patent: Feb. 11, 1997

[54] INFLATOR, INFLATION FLUID HEATER AND ASSEMBLY METHODS

[75] Inventor: Jess A. Cuevas, Scottsdale, Ariz.

[73] Assignee: TRW Inc., Lyndhurst, Ohio

[21] Appl. No.: 447,796

[22] Filed: May 23, 1995

[51] Int. Cl.$^6$ ..................................... B60R 21/26
[52] U.S. Cl. .......................... 280/736; 280/741; 280/737; 222/3
[58] Field of Search ................. 280/736, 737, 280/741, 742; 102/530, 531, 202, 202.14; 222/3, 5; 422/164–167

[56] References Cited

U.S. PATENT DOCUMENTS

| | | | |
|---|---|---|---|
| 3,966,226 | 6/1976 | Roth | 280/737 |
| 5,184,846 | 2/1993 | Goetz | 280/736 |
| 5,226,668 | 7/1993 | Delonge-Immik et al. | 280/737 |
| 5,259,644 | 11/1993 | Albrecht et al. | 280/741 |
| 5,273,312 | 12/1993 | Coultas et al. | 280/737 |
| 5,437,472 | 8/1995 | Kuretake et al. | 222/3 X |
| 5,466,420 | 11/1995 | Parker et al. | 422/164 |

FOREIGN PATENT DOCUMENTS

| | | | |
|---|---|---|---|
| 0639483 | 2/1995 | European Pat. Off. | 280/737 |
| 2443267 | 3/1975 | Germany | 280/737 |
| 9111347 | 8/1991 | WIPO . | |

Primary Examiner—Christopher P. Ellis
Attorney, Agent, or Firm—Tarolli, Sundheim, Covell, Tummino & Szabo

[57] ABSTRACT

An apparatus for inflating an air bag comprises a housing (62, 82) defining a substantially toroidal chamber (102, 104) for inflation fluid. The housing (62, 82) includes a first housing portion (66, 85) and a second housing portion (64, 84) fixed to at least one of a pair of annular surfaces of the first housing portion (66, 85). A flow passage (146, 446) extends through the second housing portion (64, 84) to permit the flow of inflation fluid from the toroidal chamber (102, 104) to an air bag located outside the housing (62, 82). A closure member (202, 502) is fixed to the second housing portion (64, 84) for blocking inflation fluid flow from the toroidal chamber (102, 104) to the flow passage (146, 446) when unruptured. A casing (222, 522) has a base section (240, 540) fixed to the second housing portion (64, 84) and a movable section (262, 562) connected to the base section. The casing (222, 522) supports an initiator (244, 544) that generates an initiating gas upon actuation. The movable section (262, 562) separates from the base section (240, 540) in response to actuation of the initiator (244, 544) and effects the rupture of the closure member (202, 502). An ignitable material (224, 524) is located in the casing (222, 522) to produce combustion products, upon being ignited by the initiating gas, to heat and pressurize the inflation fluid. A stop (322, 622) moves with the movable section (262, 562) of the casing (222, 522) to limit movement of the movable section relative to the second housing portion (64, 84) and define a flow path (324, 624) for inflation fluid to flow through from the toroidal chamber (102, 104) to the flow passage (146, 446).

37 Claims, 7 Drawing Sheets

INFLATOR, INFLATION FLUID HEATER AND ASSEMBLY METHODS

BACKGROUND OF THE INVENTION

1. Technical Field

The present invention relates to an inflatable vehicle occupant restraint device. In particular, the present invention relates to an inflator for inflating an air bag.

2. Description of the Prior Art

Inflators for air bag systems having inflation fluid stored under pressure are known. PCT Publication 91/11347 discloses one such inflator. The inflator includes a housing defining a pair of closed chambers. One chamber stores an inflation fluid under pressure and the other chamber houses an igniter. A closure disk blocks fluid communication between the two chambers. The igniter is actuatable to move a member which breaks the closure disk to allow the inflation fluid to flow from the one chamber into an air bag.

Another inflator is disclosed in U.S. Pat. No. 5,184,846 and includes a container which stores an inflation fluid. An ignition chamber contains an ignitable propellant materials. The propellant material, when ignited, produces combustion products including heat and gas for augmenting the gas in the container. The ignition chamber is closed by a piston which blocks fluid communication between the propellant material in the ignition chamber and the gas in the container. An igniter ignites the propellant material upon the occurrence of a vehicle collision. The resulting combustion products cause the gas pressure in the ignition chamber to increase to an elevated level. The gas pressure in the ignition chamber then moves the piston into an actuated position. When the piston moves into the actuated position, it opens the container to release the gas to flow from the container to the vehicle occupant restraint. The piston also opens fluid communication between the ignition chamber and the container.

Another inflator disclosed in U.S. patent application Ser. No. 08/409,871, filed Mar. 24, 1995, which is a continuation of Ser. No. 08/110,159, filed Aug. 20, 1993, includes a pressure vessel, an ignitable material and a cup member. The pressure vessel defines a sealed storage chamber containing inflation fluid for inflating the inflatable device. The pressure vessel further has a closure wall which is rupturable to open an outlet opening through which the inflation fluid flows outward from the storage chamber. The ignitable material produces combustion products including heat for heating and pressurizing the inflation fluid in the storage chamber.

The cup member is located radially inward of a ring shaped portion of the storage chamber, and has a piston which is movable between an unactuated position and an actuated position. The piston of the cup member includes a plunger for rupturing the closure wall upon movement of the piston from the unactuated position to the actuated position. The cup member further has a rupturable portion which holds the piston portion in the unactuated position.

The apparatus further includes an igniter for igniting the ignitable material and for causing pressure to develop a thrust against the cup member. The thrust ruptures the rupturable portion of the cup member, and propels the piston portion of the cup member from the unactuated position to the actuated position.

SUMMARY OF THE INVENTION

The present invention is directed to an air bag inflator, a heating device for heating inflation fluid in an air bag inflator, and methods for assembling the inflator and the heating device. The inflator is an efficient and a relatively compact structure for inflating an air bag. The heating device, upon actuation, breaks a closure to allow the inflation fluid to flow from an inflation fluid chamber to an air bag while providing a radial flow of combustion products to heat the inflation fluid remaining in the chamber. The methods for assembling the inflator and the heating device are particularly adapted to automated assembly.

The inflator comprises a housing having a central axis and defining a substantially toroidal chamber for storing an inflation fluid under pressure. The housing includes a first housing portion and a second housing portion welded to at least one annular surface of the first housing portion. A flow passage extends through the second housing portion to permit the flow of inflation fluid between the toroidal chamber and an air bag located outside the housing. A closure member is fixed to the second housing portion to block the flow of inflation fluid from the toroidal chamber to the flow passage when the closure member is unruptured. When ruptured, the closure member permits inflation fluid to flow from the toroidal chamber and the flow passage.

An actuatable initiator generates an initiating gas upon actuation. A casing has a base section fixed to the second housing portion and a movable section connected to the base section. The casing supports the initiator. The movable section separates from the base section in response to actuation of the initiator and effects the rupture of the closure member. An ignitable material located in the casing produces combustion products upon being ignited by the initiating gas to heat and pressurize the inflation fluid. A stop moves with the movable section and limits movement of the movable section relative to the second housing portion and defines a flow path between the movable section and the second housing portion.

A movable cup is located around the ignitable material and has means for holding the cup in a predetermined initial position relative to the casing prior to ignition of the ignitable material. One of the movable section of the casing and the cup has a portion to engage and rupture the closure member. The stop is formed on the cup as a plurality of axially extending shoulders.

A surface defines a recess in the second housing portion. The recess includes the flow passage. The closure member extends across the recess. The cup has a portion extendable at least partially into the recess to rupture the closure member. Alternatively, the movable section of the casing extends at least partially into the recess to rupture the closure member.

The casing includes a cylindrical portion defining a chamber upon which the initiating gas acts to break a frangible section connecting the movable section and the base section. The frangible section of the casing includes a circumferentially extending stress riser formed in a cylindrical portion of the casing. The ignitable material surrounds the frangible section at an axial location adjacent the circumferentially extending stress riser. The initiating gas is directed radially outward towards the ignitable material upon breakage of the frangible section. Radial flow passages for the combustion products produced by ignition of the ignitable material are defined by cooperating slots formed in the base portion of the casing and in the cup.

The first housing portion has an axial end portion deformed inwardly and welded to the second housing portion. The first housing portion may alternately comprise a pair of members fixed together. At least one of the members is cup-shaped. Preferably, the pair of members of the first housing portion are cup-shaped and are fixed together at a location between axially opposite ends of the first housing portion. The second housing portion further includes a tubular body portion fixed to the first housing portion with openings for directing the combustion products into the toroidal chamber and openings for directing inflation fluid from the chamber to the flow path defined by the stop.

The heating device for heating an inflation fluid in an air bag inflator comprises an actuatable initiator for producing an initiating gas upon actuation. A casing has a base section attachable to a housing of an air bag inflator. A movable section of the casing is connected to the base section. The casing supports the initiator. The movable section moves away from the base section in response to actuation of the initiator. The movable section effects flow of inflation fluid from the air bag inflator after moving away from the base section. An ignitable material is located in the casing and produces combustion products upon being ignited by the initiating gas to effect movement of the movable section of the casing away from the base section and to heat the inflation fluid. A movable cup is located around the ignitable material and has means for holding the cup in a predetermined initial position relative to the casing prior to ignition of the ignitable material. The cup is movable from the initial position in response to ignition of the ignitable material. Radial flow passages for the combustion products are defined by cooperating slots formed in the base section of the casing and in the cup. The cooperating slots are aligned when the cup moves from the initial position. A stop moves with the movable section and limits movement of the cup relative to the air bag inflator and at least partially defines a flow path between the cup and an inner surface of the air bag inflator.

The method of assembling an air bag inflator comprises the steps of providing a first housing portion and fixing a casing to the first housing portion. An initiator is placed in the casing and secured. An ignitable material is placed in the casing to surround a frangible section of the casing. A cup is placed over the ignitable material and attached to the casing. A second housing portion is provided and has a flow passage to allow the flow of an inflation fluid through the second housing portion. A closure member is fixed to the second housing portion at a location to block fluid flow through the passage in the second housing portion. A first end of the second housing portion is attached to a first end of the first housing portion. A second end of the first housing portion is attached to a second end of the second housing portion to define a chamber for inflation fluid.

The step of attaching a second end of the first housing comprises the step of defining a substantially toroidal chamber. The step of attaching a second end of the first housing portion also includes deforming the second end of the first housing portion inwardly and welding the second end of the first housing portion to the second end of the second housing portion. Alternately, the step of attaching a second end of the first housing portion also includes providing a separated second end portion of the first housing portion and attaching the separated second end portion between and to both the first end of the first housing portion and to the second end of the second housing portion.

The method of assembling a heating device for heating air bag inflation fluid comprises the steps of providing a casing. An actuatable initiator is fixed to the casing. An ignitable material is placed in the casing to substantially surround a frangible section of the casing. A cup is placed over the ignitable material. The cup is attached to the casing to hold the cup in an initial position on the casing.

BRIEF DESCRIPTION OF THE DRAWINGS

Further advantages and features of the present invention will become apparent to one skilled in the art to which the present invention relates upon reading the following description of the invention with reference to the accompanying drawings, in which.

DESCRIPTION OF PREFERRED EMBODIMENTS

Figure 1:
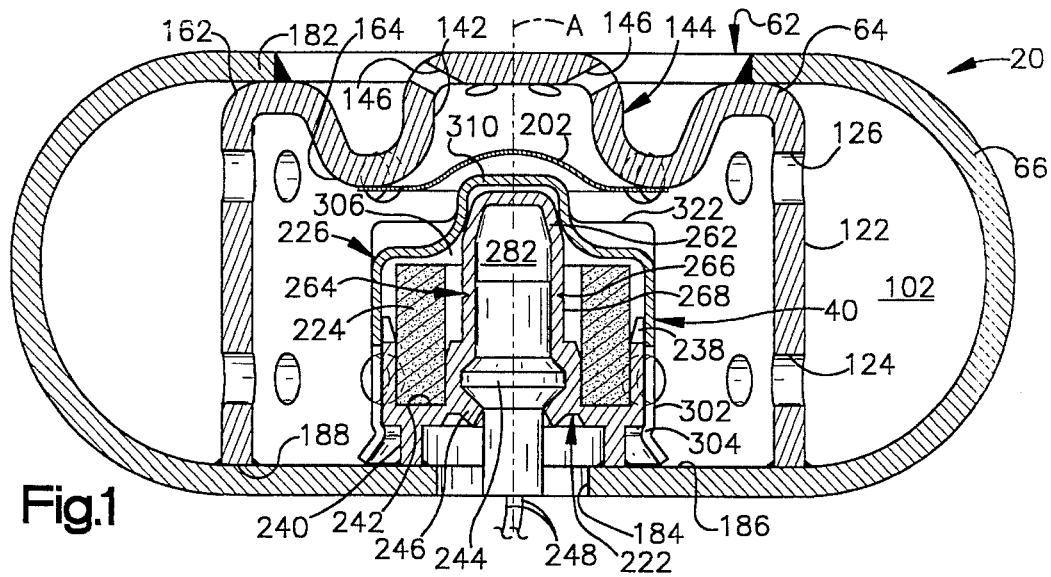
FIG. 1 is a sectional view of an air bag inflator embodying the present invention.
Figure 9:
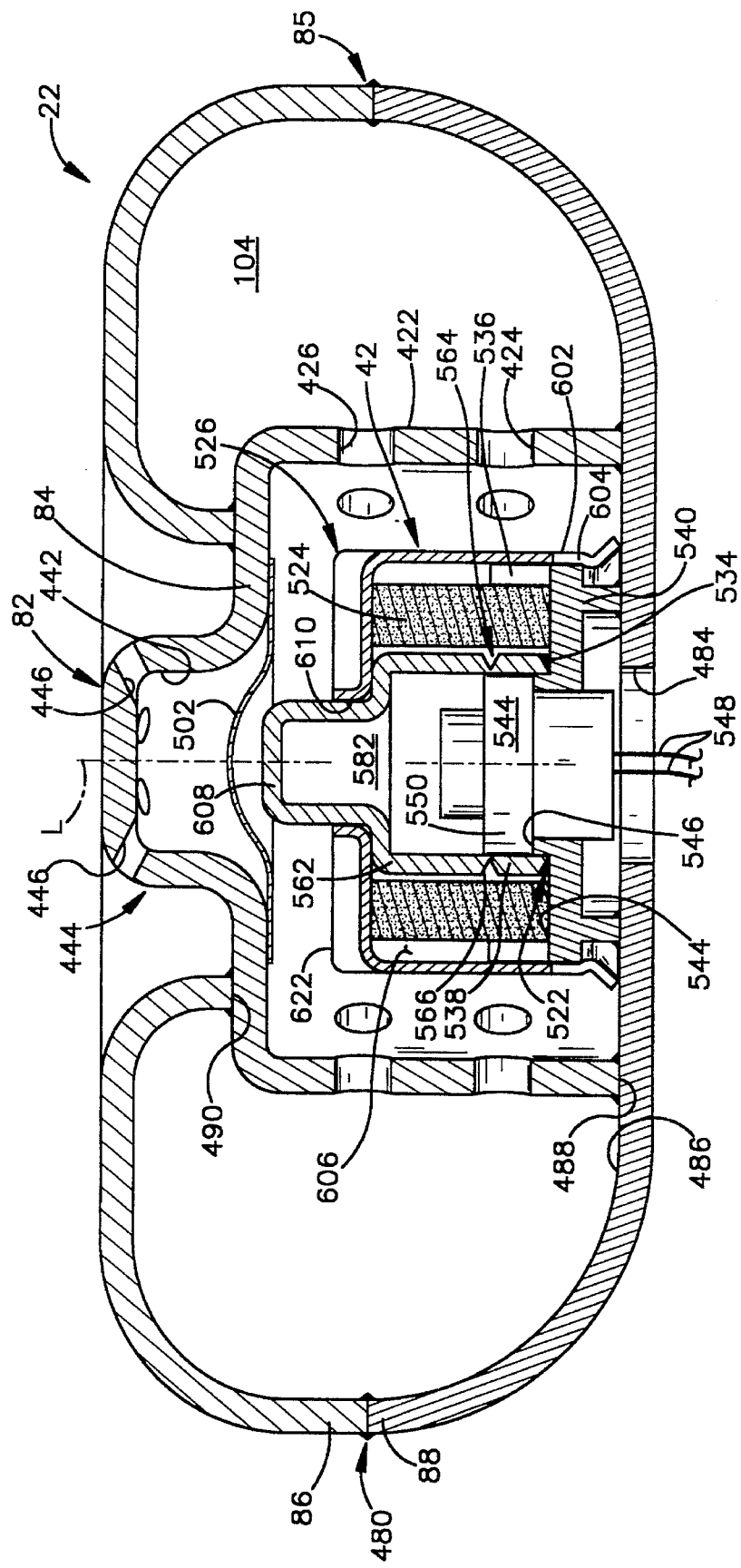
FIG. 9 is a sectional view of another air bag inflator embodying the present invention.

The present invention is directed to air bag inflators 20, 22 having a housing constructed according to one of two alternate embodiments, as illustrated in FIGS. 1 and 9, respectively. The inflators 20, 22 are for inflating an associated air bag (not shown) using a quantity of stored inflation fluid and a heating device for heating the stored inflation fluid, as is known. The present invention is also directed to heating devices 40, 42 constructed according to one of two alternate embodiments. Each of the heating devices 40, 42 is actuatable to effect the flow of inflation fluid stored in a chamber of an inflator and to heat the inflation fluid by directing combustion products radially outward of the heating device.

The inflator 20 (FIG. 1) has a housing 62 made from two housing parts 64, 66. The inflator 22 (FIG. 9) has a housing 82 made from three housing parts 84, 86, 88. The inflators 20, 22 define a substantially toroidal chamber 102 or 104, respectively, in which a non-ignitable inflation fluid, such as argon, is stored under pressure and which surrounds a respective longitudinal central axis A, L of the inflator. Both of the inflators 20, 22 may be used in any type of inflatable occupant restraint system, but are particularly suitable for use in a driver's side air bag assembly.

The heating device 40 (FIG. 1) has a one piece casing 222 for supporting ignitable material 224 and an initiator 244. The heating device 42 (FIG. 9) has a two piece casing 522 for supporting ignitable material 524 and an initiator 544. While each heating device 40, 42 will be described in association with the inflator 20, 22 to which the heating device is attached, it will be apparent that each inflator can be provided with either heating device and that the heating devices can be used with various inflators in addition to the inflators shown and described here.

Inflator and Heating Device (First Embodiment)

Structure

The housing 62 of the inflator 20 includes the one-piece inner housing 64 formed in the general shape of an inverted cup from a metal material, such as steel or aluminum. The inner housing 64 has a tubular body portion 122 with openings 124, 126 arranged in two circumferential arrays in a lower portion and an upper portion, respectively, as viewed in FIG. 1, of the tubular body. The lower portion of the tubular body 122, as viewed in FIG. 1, defines an open axial end of the inner housing 64.

The upper portion of the inner housing 64 is a substantially closed end. A recess 142 is formed in the center of the upper portion of the inner housing 64 to define a diffuser 144. A plurality of passages 146 are located in the diffuser 144 to direct the flow of inflation fluid from the inflator 20 into a desired region of the air bag in a desired pattern.

An annular shoulder 162 is formed in the upper portion of the inner housing 64 adjacent its outer periphery and radially outward from the diffuser 144. An annular projection 164 is located between the annular shoulder 162 and the diffuser 144. The annular projection 164 extends axially downward from the annular shoulder 162 and from the diffuser 144 about the axis A, as viewed in FIG. 1.

Figure 4:
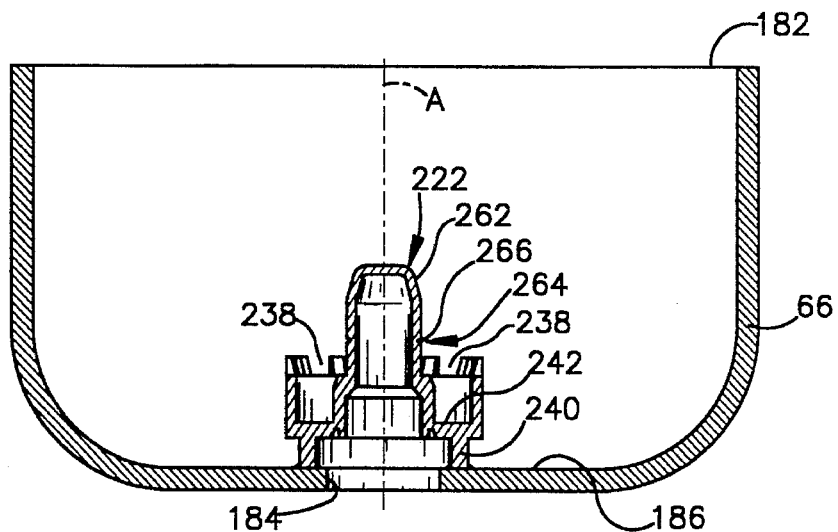
FIGS. 4–8 are sectional views illustrating sequential steps of assembly of the inflator of FIG. 1.
Figure 8:
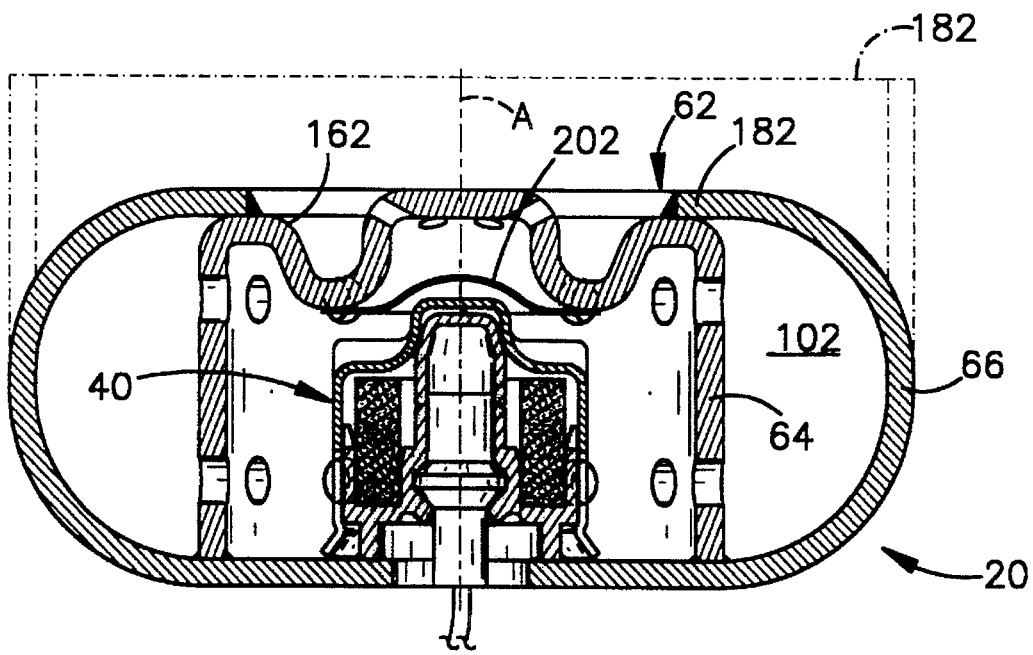

The housing 62 of the inflator 20 also includes the one-piece outer housing 66 formed from a metal material, such as steel or aluminum. Prior to final assembly, the outer housing 66 is substantially bowl-shaped with an open axial upper end 182, as illustrated in FIG. 4. A single circular opening 184 is located centrally in the lower axial end, as viewed in FIG. 1, of the outer housing along the axis A. The lower end 188 of the inner housing 64 is fixed in a suitable manner, such as by welding, in a coaxial relationship along the longitudinal central axis A to an annular portion of an inner surface 186 of the outer housing 66. The upper end 182 of the outer housing 66 is deformed radially inward and axially downward, as illustrated in FIG. 8, to engage the inner housing 64 at the annular shoulder 162. The upper end 182 of the outer housing 66 is then fixed to the annular shoulder 162 of the inner housing 64 in a suitable manner, such as by welding. No portion of the inner housing 64 extends axially outside the outer housing 66.

A closure member 202 seals the recess 142 formed in the inner housing 64 to block the flow of inflation fluid from the chamber 102 to the diffuser 144, prior to being ruptured. The housing 62 and closure member 202, thus, define the closed chamber 102 for storing inflation fluid under pressure. The closure member 202 is rupturable to allow inflation fluid to flow from the chamber 102 to the diffuser 144 after being ruptured.

The heating device 40 is attached to the inflator 20 to effect the rupture of the closure member 202 upon actuation. The heating device 40 is also for heating and pressurizing the inflation fluid located in the chamber 102. The heating device 40 includes the one-piece casing 222, the ignitable material 224 and a cup 226.

The casing 222 has a base section 240 that includes a downwardly projecting annular wall, as viewed in FIG. 1, and a radially extending web. One end of the downwardly projecting wall is fixed in a suitable manner, such as by welding, to the inner surface 186 of the outer housing 66 so that the casing extends along the axis A. The base section 240 of the casing 222 seals the central opening 184 in the lower portion of the outer housing 66. A plurality of upwardly extending projections define slots 238 (best seen in FIG. 4) in an outer end portion of the casing 222.

The casing 222 defines an annular groove 242 with its open end facing upwardly, as viewed in FIG. 1, and located coaxially along the axis A. The ignitable material 224 is formed into a tubular member which fits tightly within the surfaces defining the annular groove 242 in the casing 222. The ignitable material 224 is received in the annular groove 242 in the casing 222.

The casing 222 supports the initiator 244 in an initiating gas chamber 282 along the longitudinal axis A. A central portion 246 of the radially extending web of the casing 222 is deformed to encapsulate the body of the initiator 244. Lead wires 248 are connected to the initiator 244 to electrically communicate an actuation signal to the initiator in response to an emergency condition, such as a collision, as is known. Upon actuation, the initiator 244 produces an initiating gas inside the initiating gas chamber 282.

The casing 222 also has a movable section 262 connected to the base section 240 at a frangible section 264. The movable section 262 is movable in a direction along the axis A away from the base section 240 upon breakage of the frangible section 264. The movable section 262 separates from the base section 240 upon breakage of the frangible section 264 in response to a pressure increase in the initiating gas chamber 282 due to actuation of the initiator 244. The movable section 262 moves away from the base section 240 to cause the rupture of the closure member 202.

The frangible section 264 includes a circumferential stress riser 266 formed in a cylindrical portion 268 of the casing 222. The stress riser 266 is a weakened region of the casing 222 that breaks in response to a pressure increase within the initiating gas chamber 282 of the initiating gas. The stress riser 266 is surrounded by the ignitable material 224 and breaks circumferentially to assure that initiating gas produced by actuation of the initiator 244 flows radially outward, as indicated by the reference numeral 250 in FIG. 2, from the broken frangible section 264 of the casing 222 towards the ignitable material. The ignitable material 224 is ignitable by contact with the initiating gas to produce combustion products.

Surrounding the ignitable material 224 is the cup 226. The cup 226 is inverted and, thus, is closed at its upper end, as viewed in FIG. 1. A plurality of axially extending resilient clips 302 are formed in spaced apart circumferential array at a lower end of the cup 226. The clips 302 define a plurality of circumferentially spaced slots 304.

Figure 2:
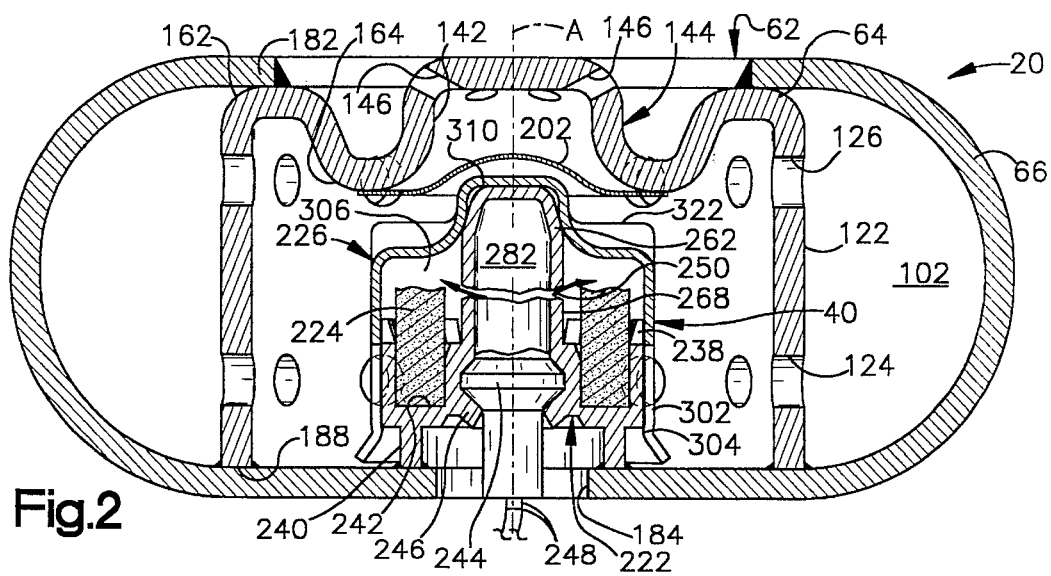
FIGS. 2 and 3 are views illustrating parts of the air bag inflator of FIG. 1 in different positions.

The cup 226 is illustrated in FIG. 1 located in an initial position with the clips 302 retaining the cup 226 on the base section 240 of the casing 222. The cup 226 and casing 222 cooperate when they are in the initial position to define a closed chamber 306 for the combustion products produced by ignition of the ignitable material 224. Upon ignition of the ignitable material 224, the pressure of the combustion products forces the cup 226 to move upward, as viewed in FIGS. 2 and 3. As illustrated in FIG. 2, the cup 226 moves upwardly along the axis A a short distance in response to an initial pressure increase in the closed chamber 306 acting on downwardly facing surfaces of the cup 226.

Figure 3:
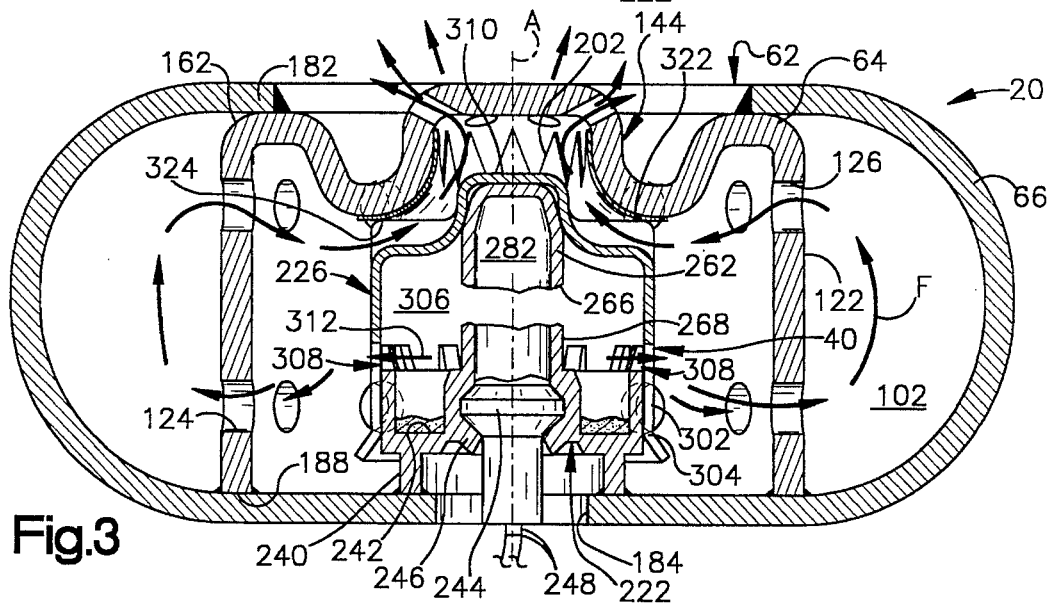

A short time after the cup 226 moved to the position illustrated in FIG. 2, it moves further upwardly towards the position illustrated in FIG. 3. An upwardly projecting end portion 310 of the cup 226 engages and ruptures the closure member 202. Radially extending and spaced apart stops 322 are formed in a circumferential array on the upper portion of the cup 226. The stops 322 extend upwardly an axial extent less than the projecting end portion 310 of the cup 226, so the end portion extends partially into the recess 142 and ruptures the closure member 202. As the cup 226 and movable section 262 of the casing 222 move to the position illustrated in FIG. 3, the stops 322 engage the annular projection 164 of the inner housing 64.

The stops 322 limit upward movement of the cup 226 so the end portion 310 does not extend further into the recess 142 and block the flow of inflation fluid to the passages 146 in the diffuser 144. The stops 322 also cooperate with the annular projection 164 of the inner housing 64 to define a plurality of flow paths 324 between the cup 226 and the inner housing 64. The inflation fluid may flow from the chamber 102 through the flow paths 324 to the diffuser 144 and then exit the inflator 20 by flowing through the passages 146 and into an air bag.

At the same time that the end portion 310 of the cup 226 ruptures the closure member 202 the slots 304 at the lower end of the cup 226 move into alignment with the slots 238 in the casing 222. This opens the chamber 306 and establishes radial flow passages 308 between the base section 240 of the casing 222 and the cup 226 through the aligned slots 238 and slots 304. The radial flow passages 308 provide the only exit for the combustion products to escape from the chamber 306. The flow passages 308 direct the combustion products to flow radially outward, as indicated by the reference numeral 312 in FIG. 3, towards the chamber 102 to heat and further pressurize the inflation fluid.

The radial flow of the combustion products from the flow passages 308 is directed substantially at the lower openings 124 in the tubular body 122 of the inner housing 64. Thus, the flow F of inflation fluid as it is heated and pressurized, as illustrated in FIG. 3, moves to an area of relatively lower pressure outside the inflator 20 through the upper openings 126 in the cylindrical body 122, through flow paths 324, defined by the annular projection 164 and stops 322 of the cup 226, and through the passages 146 in the diffuser 144.

Operation

When the vehicle in which the inflator 20 is installed experiences a condition requiring inflation of an air bag to protect a vehicle occupant, an electrical signal is communicated to the initiator 244 over the lead wires 248. The electrical signal actuates the initiator 244 to release initiating gas within the initiating gas chamber 282. The casing 222 breaks at the frangible section 264. The movable section 262 of the casing 222 moves upwardly a relatively short distance, as illustrated in FIG. 2. The movable section 262 moves from the position illustrated in FIG. 1 to the position illustrated in FIG. 2 within the axially upward extending portion 310 of the cup 226.

Initiating gas flows radially outward from the broken frangible section 264 and ignites the ignitable material 224. The combustion products produced by the ignitable material 224 exert a force within the closed chamber 306 of the cup 322 to move the cup to the position illustrated in FIG. 3. The axial projecting end portion 310 of the cup 226 ruptures the closure member 202 to permit inflation fluid to flow into the diffuser 144. The stops 322 on the cup 226 block any further upward movement of the cup and movable section 262 and define the flow paths 324 between the inner housing 64 and the cup.

As the ignitable material 224 continues to burn, combustion products flow out of the radial flow passages 308 in a direction toward the openings 124 in the lower portion of the cylindrical body 122 of the inner housing 64. The combustion products heat and further pressurize the inflation fluid in the chamber 102. The heating and pressurization of the inflation fluid causes the inflation fluid to expand and flow to a relatively lower pressure area outside the inflator 20 through the flow paths 324, illustrated in FIG. 3.

The radial flow of the initiator gas is effective to create a relatively evenly distributed radial ignition of the ignitable material 224. Combustion of the ignitable material 224 causes the cup 226 to move to rupture of the closure 202 and to heat and further pressurize the inflation fluid in the chamber 102. This heating and further pressurizing of the inflation fluid forces the inflation fluid to flow into the diffuser 144 and eventually into the air bag.

Assembly

Referring to FIGS. 4–8, a method of assembling the heating device 40 and a method of assembling the heating device and the inflator 20 is illustrated. While the assembly of the heating device 40 is described in conjunction with the assembly of the inflator 20, it will be apparent that the heating device can be assembled separately for use in an inflator other than the inflator shown and described here.

Figure 5:
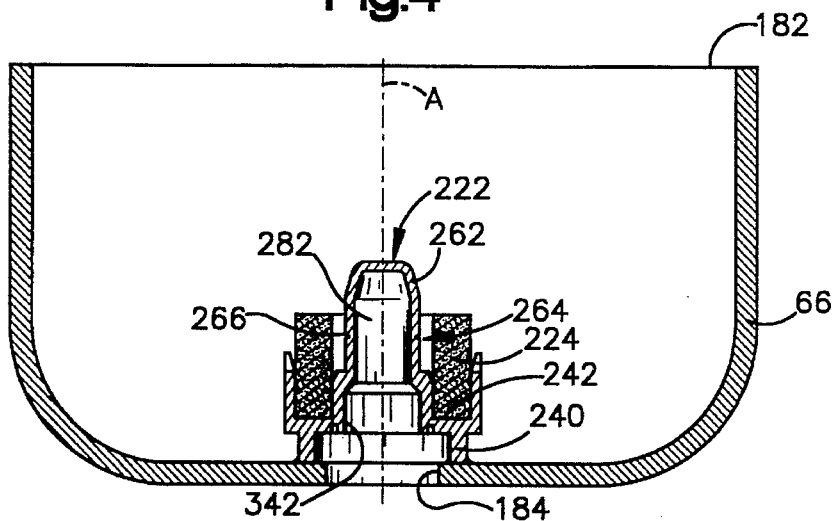

As illustrated in FIG. 4, the one-piece casing 222 is fixed to the inner surface 186 of the outer housing 66 so that the casing 222 extends along the axis A. The casing 222 seals the opening 184 in the outer housing 66. As illustrated in FIG. 5, the ignitable material 224 is then placed in the annular groove 242 in the casing 222 to surround the stress riser 266 in the frangible section 264 of the casing.

Figure 6:
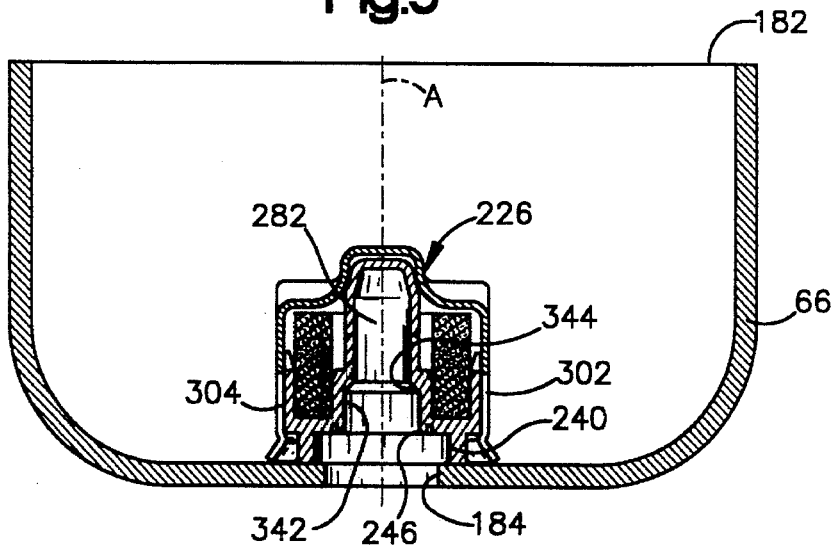

As illustrated in FIG. 6, the cup 226 is then moved axially downward along the axis A so the clips 302 ride on the outside of the casing 222 to guide movement of the cup. The clips 302 move radially inward, when the cup 226 reaches the position illustrated in FIG. 6, to hold the cup against the casing 222. Placement of the ignitable material 224 in and the cup 226 on the casing 222 is particularly suitable for automated or robotic assembly because both steps essentially only require axial movement and release. No fastening of the cup 226 is required because the clips 302 attach the cup to the casing 222 when the cup reaches the predetermined axial position relative to the casing, as illustrated in FIG. 6.

Figure 7:
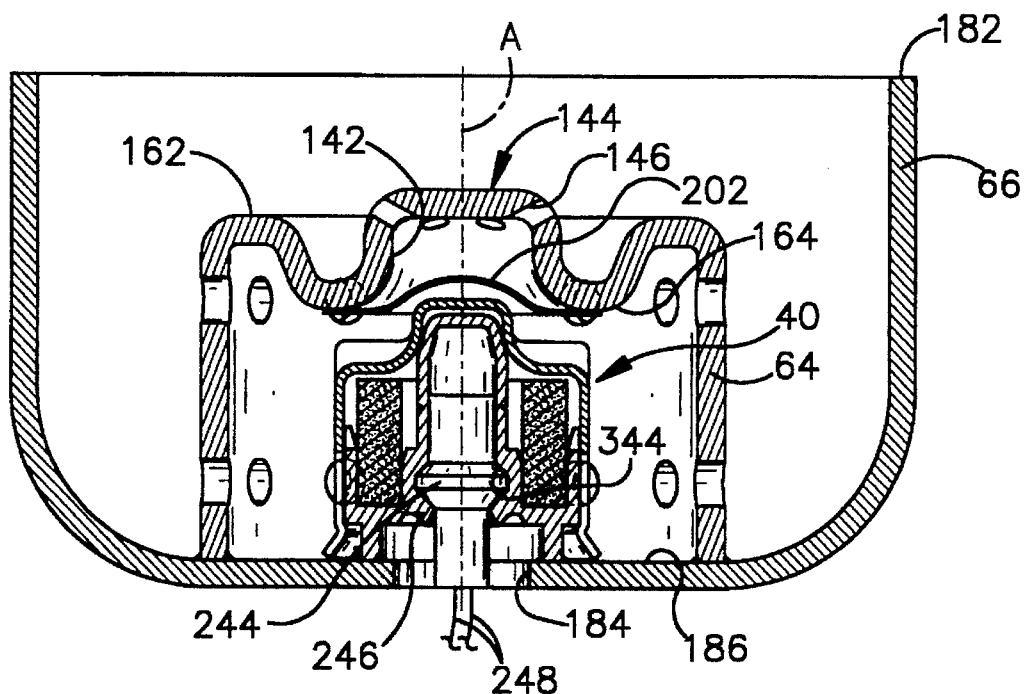

An initiator body chamber 342 (FIG. 6) is defined by the casing 222 as an axially lower portion of the initiating gas chamber 282. As illustrated in FIG. 7, the initiator 244 is moved axially into the initiator body chamber 342 until the initiator engages an annular shoulder 344 of the casing 222. The lead wires 248 extend through the opening 184 in the outer housing 66. The central portion 246 of the radially extending web of the casing 222 is deformed radially inward and axially upward against the initiator 244 to retain the initiator in the initiator body chamber 342 of the casing to provide the assembled heating device 40.

The closure member 202 is fixed at its outer periphery to the annular projection 164 formed in the inner housing 64. The inner housing 64 is then placed coaxially within the outer housing 66 around the heating device 40 and welded to an annular portion of the inner surface 186. As illustrated in FIG. 8, the upper axial end portion 182 of the outer housing 66 is deformed radially inward and axially downward to engage the annular shoulder 162 of the inner housing 66. The end portion 182 of the outer housing 66 is then welded to the annular shoulder 162 of the inner housing 64 around the entire circumferentially engaging surface portion to seal the housing 62 and define the toroidal chamber 102 for inflation fluid.

Inflator and Heating Device (Second Embodiment)

Structure

The housing 82 (FIG. 9) of the inflator 22 includes the one-piece inner housing 84 formed in the general shape of an inverted cup from a metal material, such as steel or aluminum. The housing 82 also includes the two-piece outer housing 85 welded to the inner housing to define the toroidal chamber 104. The outer housing 85 is formed from two cup-shaped outer housing members 86, 88 which are made from a metal material, such as steel or aluminum.

The inner housing 84 has a tubular body 422 with flow openings 424, 426 arranged in two circumferential arrays at a lower portion and an upper portion, respectively, as viewed in FIG. 9, of the tubular body. The lower portion of the tubular body 422, as viewed in FIG. 9, defines an open axial end of the inner housing 84. The upper portion of the inner housing 84 is substantially closed. A recess 442 is formed in the center of the upper portion of the inner housing 84 to define a diffuser 444. A plurality of passages 446 are located in the diffuser 144 to direct the flow of inflation fluid into a desired region of the air bag in a desired pattern.

The upper outer housing member 86 is welded to the lower outer housing member 88 at a central portion 480 intermediate the axial ends of the outer housing 85. A circular opening 484 is located centrally in the lower axial end, as viewed in FIG. 9, of the lower outer housing member 88 along the axis L. The lower end 488 of the inner housing 84 is fixed in a suitable manner, such as by welding, to an inner surface 486 of the lower outer housing member 88 along the axis L. The upper outer housing member 86 is fixed, in a suitable manner, such as by welding, to the inner housing 84 at an annular surface 490 located radially outward of the diffuser 444.

A closure member 502 seals the recess 442 formed in the inner housing 84 to block the flow of inflation fluid from the chamber 104 to the diffuser 444. The housing 82 and closure member 502 thus define the closed toroidal chamber 104 for storing inflation fluid under pressure. The closure member 502 is rupturable to permit inflation fluid to flow from the chamber 104 to the diffuser 444 after being ruptured.

The heating device 42 is attached to the inflator 22 for causing the rupture of the closure member 502 upon actuation. The heating device 42 is also for heating and pressurizing the inflation fluid located in the chamber 104. The heating device 42 includes a two-piece casing 522, an ignitable material 524 and a cup 526.

The casing 522 has a base section 540 that includes a downwardly projecting annular wall, as viewed in FIG. 9, and a radially extending web. One end of the downwardly projecting wall is fixed to the lower outer housing member 88 so that the casing 522 extends along the axis L. The base section 540 of the casing 522 seals the central opening 484 in the lower outer housing member 88. The casing 522 also includes a canister 538 fixed to the base section 540 at a weld 534 to extend coaxially along the axis L. The base section 540 of the casing 522 and the canister 538 define an annular groove 542 with its open end facing upwardly, as viewed in FIG. 1. A plurality of axially extending slots 536 are provided in an outer wall of the base section 540.

The casing 522 supports an actuatable initiator 544 along the axis L. The base section 540 of the casing 522 has an inner annular shoulder 546 which is located radially inward of the canister 538 and which supports a flange 550 on the initiator 544. Lead wires 548 are connected to the initiator 544 and extend through the base section 540 and the opening 484 to communicate an actuation signal to the initiator electrically in response to an emergency condition, such as a collision, as is known.

The canister 538 of the casing 522 has a movable section 562 connected to the base section 540 by an intermediate frangible section 564. The movable section 562 is movable in a direction away from the base section 540 upon breakage of the frangible section 564. The movable section 562 moves away from the base section 540 to engage and rupture the closure member 502.

The frangible section 564 includes a circumferential stress riser 566 formed in the canister 538 of the casing 522. The stress riser 566 is a weakened region of the casing 522 that breaks in response to a pressure increase within a closed chamber 582 defined by the casing. The stress riser 566 breaks circumferentially to assure that initiating gas produced by actuation of the initiator 544 flows radially outward of the broken casing 522, as indicated by the reference numeral 580 in FIG. 10.

The ignitable material 524 is received in the annular groove 542. The ignitable material 524 is formed into a tubular member to fit in the annular groove 542. The initiating gas ignites the ignitable material 524 to produce combustion products. The combustion products are then directed towards the inflation fluid in the chamber 104 to increase the temperature and pressure of the inflation fluid.

Surrounding the ignitable material 524 is the cup 526. The cup 526 is inverted and thus has a generally closed upper end. A plurality of axially extending resilient clips 602 are formed in a spaced apart circumferential array at the lower end of the cup 526, as viewed in FIG. 9. The clips 602 define a plurality of spaced apart slots 604. The generally closed upper end of the cup 526 has a central opening 610 through which an upwardly projecting end portion 608 of the movable section 562 of the canister 538 extends. The cup 526 defines a substantially closed chamber 606 with the base section 540 of the casing 522 when the cup and base section are in an initial relative position, as illustrated in FIG. 9. The clips 602 have a relatively shorter axial extent than the clips 302 of the cup 226 of the heating device 40 illustrated in FIGS. 1–3. The cup 526 is illustrated in FIG. 9 located in the initial position with the clips 602 retaining the cup on the base section 540 of the casing 522.

Figure 10:
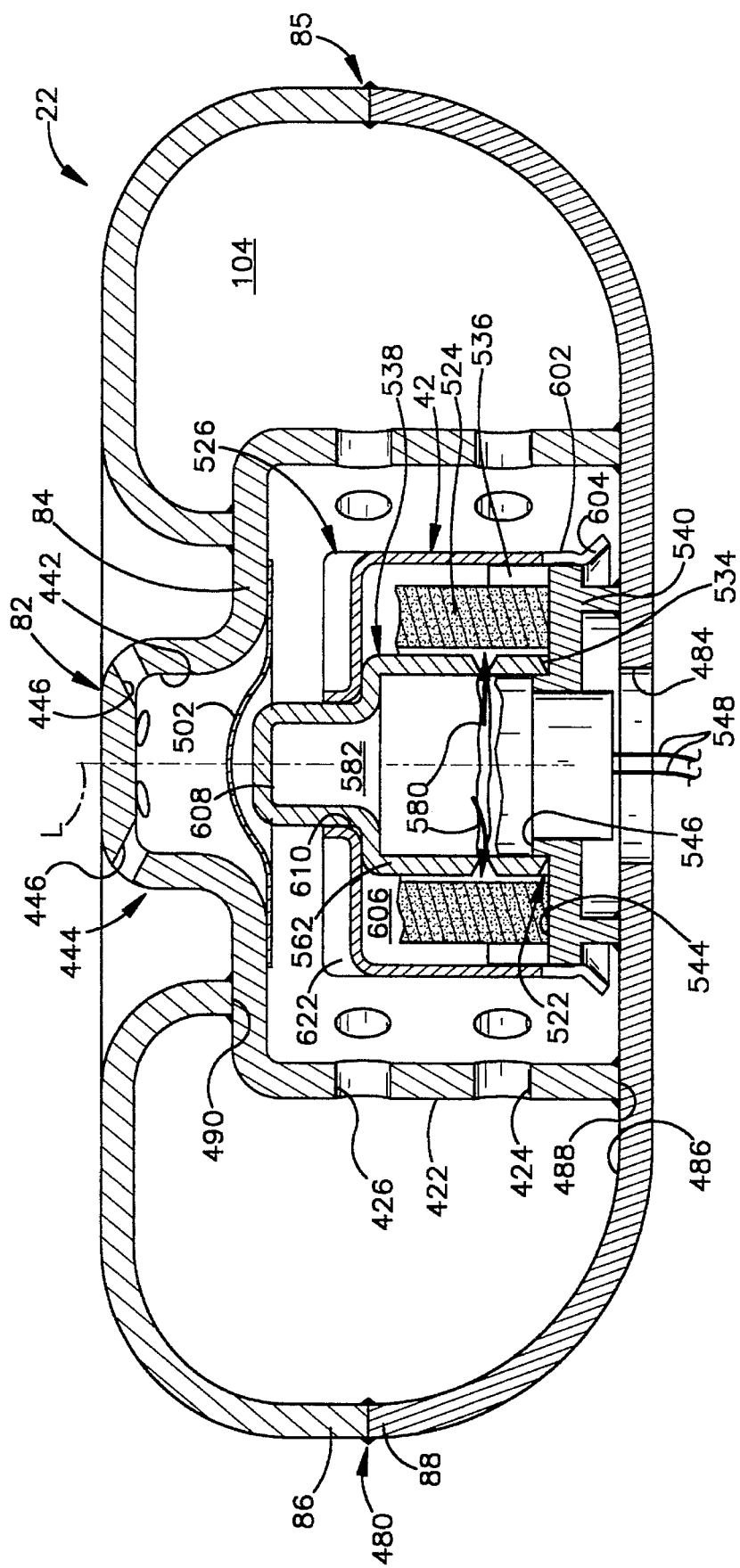
FIGS. 10 and 11 are views illustrating parts of the air bag inflator of FIG. 9 in different positions.
Figure 11:
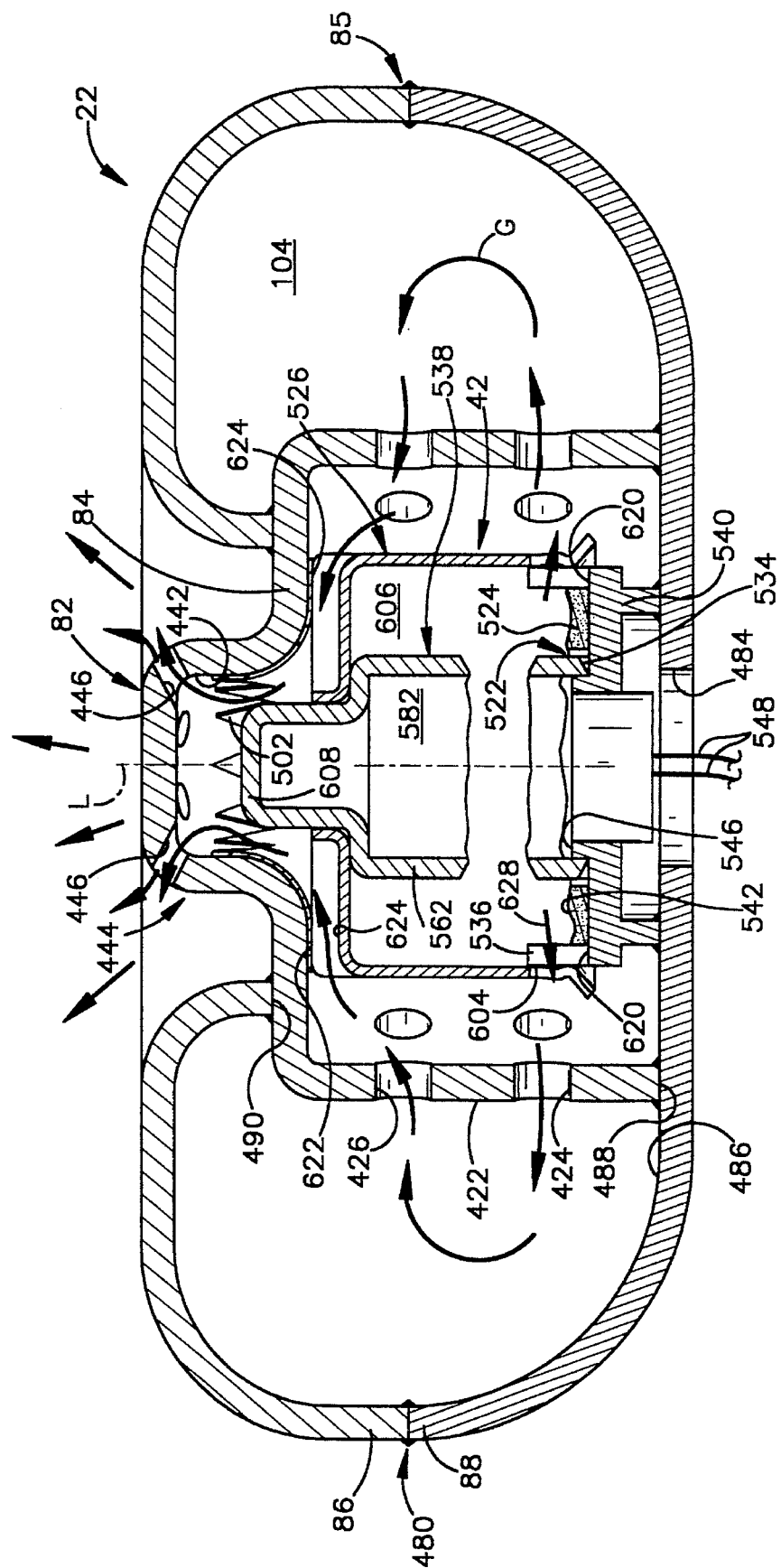

Upon ignition of the ignitable material 524, the expanding combustion products act on the downwardly facing surfaces of the chamber 606 to force the cup 526 upwardly, as viewed in FIGS. 10 and 11. The cup 526 is moved upwardly a short distance along the axis L, as illustrated in FIG. 10, in response to an initial pressure increase in the chamber 606 due to the combustion of the ignitable material 524. As pressure within the chamber 606 increases, the cup 526 moves further upward along the axis L to the position illustrated in FIG. 11. An end portion 608 of the movable section 562 engages and ruptures the closure 502, as illustrated in FIG. 11, to enable inflation fluid to flow from the chamber 104 into the diffuser 444.

Radially extending and spaced apart stops 622 are formed in a circumferential array on the upper portion of the cup 526. The stops 622 extend upwardly an axial extent less than the end portion 608 of the movable section 562 so the end portion can rupture the closure 502. When the cup 526 moves to the position illustrated in FIG. 11, the stops 622 engage the inner housing 84 near the diffuser 444. An upwardly facing annular portion of the movable section 562 around the end portion 608 engages a downwardly facing surface around the opening 610 of the cup 526 to prevent further upward movement of the movable section.

The stops 622, thus, limit upward movement of the cup 526 and movable section 562 so the end portion 608 of the movable section does not extend further into the recess 442 and block the flow of inflation fluid to the passages 446 in the diffuser 444. The stops 622 also cooperate with the inner housing 84 to define a series of flow paths 624 between the cup 526 and the inner housing 84 so the heated inflation fluid may flow from the chamber 104 into the diffuser 444.

At the same time as the upwardly projecting end portion 608 of the canister 538 ruptures the closure member 502, the slots 604 in the lower end of the cup 526 move into alignment with the slots 536 in the base portion of the casing 522. This opens the chamber 606 and provides radial flow passages 620 between the aligned slots 536 in the base section 540 and the slots 604 in the cup 526. The radial flow passages 620 provide the only exit for the combustion products to escape from the chamber 606. The flow passages 620 direct the combustion products radially outward towards the chamber 104.

The radially outward flow of the combustion products through the flow passages 620, indicated by the reference numeral 628 in FIG. 11, is directed at the lower openings 424 in the tubular body 422 of the inner housing 84. The open flow passages 620 are at approximately the same location along the axis L as the opening 424. Thus, the flow G of inflation fluid as it is being heated and pressurized is illustrated in FIG. 11 as flowing from the chamber 104 to an area of relatively lower pressure outside the inflator 22 through the flow paths 624.

Operation

When the vehicle in which the inflator 22 is installed experiences a condition requiring inflation of an air bag to protect a vehicle occupant, an electrical signal is communicated to the initiator 544 over the lead wires 548. The electrical signal actuates the initiator 544 to release initiating gas within the initiating gas chamber 582. The canister 538 of the casing 522 breaks at the frangible section 564. The movable section 562 of the canister 538 moves upwardly slightly as illustrated in FIG. 10.

Initiating gas flows radially outward from the broken frangible section 564 and ignites the ignitable material 524. The burning of the ignitable material 524 produces combustion products which exert a force within the chamber 606 of the cup 526 to move the cup to the position illustrated in FIG. 11. This permits the movable section 562 to move upwardly also. Movement of the cup 526 occurs as the forces of the clips 602 holding the cup on the base section 540 of the casing 522 are overcome and the clips 602 resiliently move radially outward.

The axial extending portion 608 of the movable section 562 engages and ruptures the closure member 502 to permit inflation fluid to f! low from the chamber 104 into the diffuser 444. The stops 622 on the cup 526 limit further upward movement of the cup and the movable section 562. As the ignitable material 524 continues to burn, combustion products flow out of the radial flow passages 620 in a direction towards the openings 424 in the inner housing 84. The combustion products heat and further pressurize the inflation fluid in the chamber 104. The heating and pressurization of the inflation fluid causes it to expand and be released to a relatively lower pressure area outside the inflator 22 through the flow paths 624, as illustrated in FIG. 11.

The radial flow of the initiator gas is effective to create a relatively even combustion of the ignitable material 524 to effect the rupture of the closure member 502 and heat the inflation fluid in the chamber 104. This heating and further pressurizing of the inflation fluid causes a relatively even expansion of the inflation fluid to flow in a relatively evenly distributed manner into the diffuser 444.

Assembly

Referring to FIGS. 12–15, a method of assembling the heating device 42 and of assembling the heating device and the inflator 22 is illustrated. While the assembly of the heating device 42 is described in conjunction with the assembly of the inflator 22, it will be apparent that the heating device can be assembled separately for use in inflators other than the inflator shown and described here.

Figure 12:
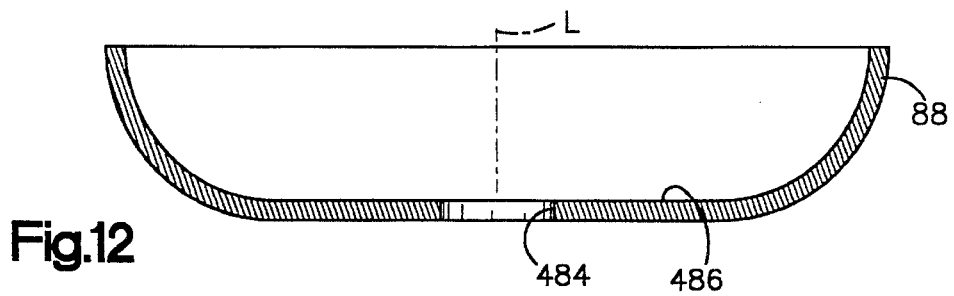
FIGS. 12–15 are sectional views illustrating sequential steps of assembly of the inflator of FIG. 9.
Figure 13:
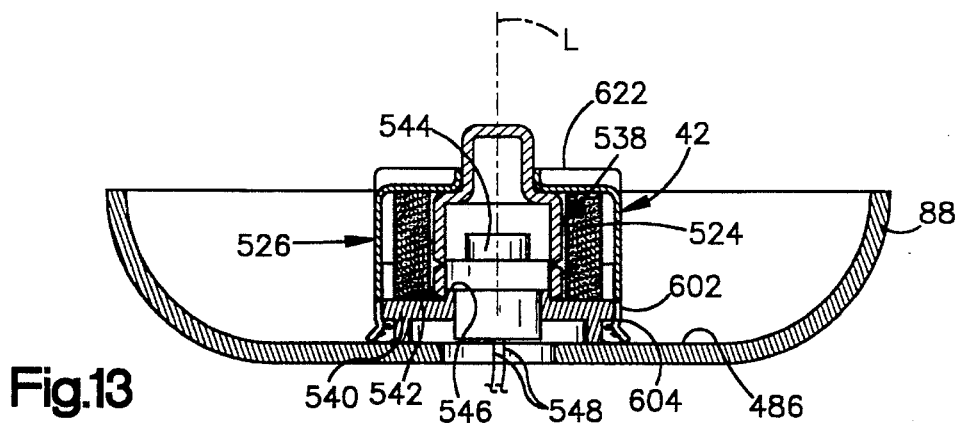

As illustrated in FIG. 12, the lower outer housing portion 88 is suitably supported to open upwardly. As illustrated in FIG. 13, the base section 540 of the casing 522 is fixed to the inner surface 486 of the lower outer housing portion 88 so that the base section extends along axis L. The base section 540 of the casing 522 seals the opening 484 in the lower outer housing portion 88.

The initiator 544 (FIG. 13) is moved axially downward into the casing 522 until it engages the annular shoulder 546 of the base section 540 of the casing. The lead wires 548 of the actuator 544 extend through the base section 540 and the opening 484 in the lower outer housing portion 88. The lower end portion of the canister 538 is moved axially downward so it is placed around the shoulder 546. The lower end portion of the canister 538 is fixed to the base section 540 of the casing to retain the initiator 544 in the casing. The ignitable material 524 is then placed in the annular groove 542 to surround the stress riser 566 of the frangible section 564 of the canister 538.

The cup 526 is then moved axially downward along the axis L so the clips 602 ride on the outside of the base portion 540 of the casing 522. The clips 602 move radially inward around an annular projection on the base section 540 when the cup 526 reaches the position illustrated in FIG. 13 to hold the cup against the casing 522 and provide the assembled heating device 42. Placement of the initiator 544, the ignitable material 524 and the cup 526 in and on the casing 52 are particularly suitable for automated or robotic assembly because these steps essentially only require axial movement and release.

Figure 14:
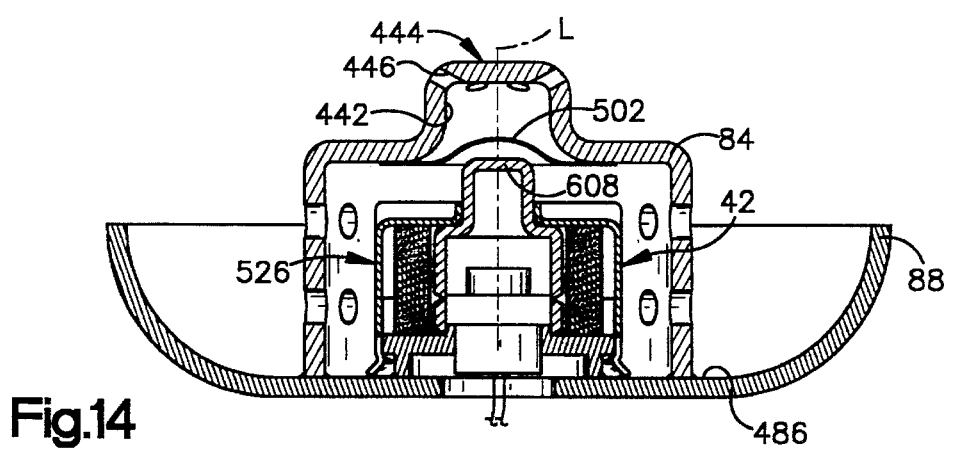
Figure 15:
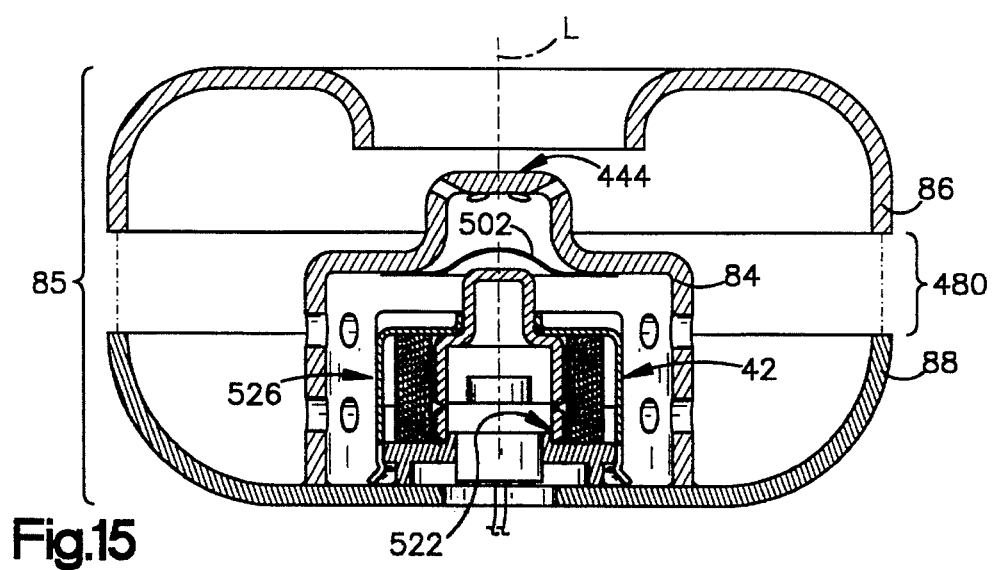

The closure member 502 is fixed to the inner housing 84 to close the recess 542. The inner housing 84 is then placed coaxially within the lower outer housing member 88 and welded, as illustrated in FIG. 14. As illustrated in FIG. 15, the upper outer housing member 86 is moved axially downward to engage the upper end portion of the inner housing 84 and the lower outer housing member 88. The upper outer housing member 86 is welded to the inner housing 84 and to the lower outer housing member 88 to seal the housing 82 and define the toroidal chamber 104 for inflation fluid and provide the assembled inflator 22.

From the above description of the invention, those skilled in the art will perceive improvements, changes and modifications. Such improvements, changes and modifications within the skill of the art are intended to be covered by the appended claims.

Having described the invention, the following is claimed:

1. An inflator for inflating an air bag, said inflator comprising:

a housing having a central axis and defining a toroidal chamber for inflation fluid surrounding the central axis, said housing including a first housing portion and a second housing portion disposed within said first housing portion, said second housing portion engaging and fixed to a pair of axially spaced annular surfaces of said first housing portion;

a flow passage extending through said second housing portion to permit the flow of inflation fluid from the toroidal chamber to a location outside said housing;

a closure member fixed to said second housing portion to block the flow of inflation fluid from the toroidal chamber to the flow passage when unruptured and to permit the flow of inflation fluid from the toroidal chamber to the flow passage when ruptured;

an actuatable initiator for generating an initiating gas upon actuation;

a casing having a base section fixed to one of said first and second housing portions and a movable section connected to said base section, said casing supporting said initiator, said movable section separating from said base section in response to actuation of said initiator to effect the rupture of said closure member;

an ignitable material supported by said casing for producing combustion products upon being ignited by said initiating gas to heat and pressurize the inflation fluid; and stop means movable with said movable section of said casing for limiting movement of said movable section relative to said second housing portion and for defining a flow path for inflation fluid to flow through from said toroidal chamber to said flow passage in said second housing portion.

2. The inflator set forth in claim 1 further including a cup located about said ignitable material, said cup including a clip for retaining said cup in a predetermined initial position relative to said base section of said casing prior to actuation of said initiator.

3. The inflator set forth in claim 2 further including radial flow passages through which the combustion products can flow and which are defined by cooperating slots formed in said base section of said casing and in said cup.

4. The inflator set forth in claim 2 further including a surface defining a recess in said second housing portion, the recess including said flow passage, said closure member extending across the recess, and one of said movable section of said casing and said cup having a portion extendable at least partially into the recess to rupture said closure member.

5. The inflator set forth in claim 2 wherein said stop means is formed On said cup as a plurality of axially extending shoulders.

6. The inflator set forth in claim 1 wherein said casing further includes a cylindrical portion defining a chamber upon which the initiating gas can act to separate said movable section from said base section.

7. The apparatus set forth in claim 1 further including a frangible section connecting said movable section of said casing to said base section and wherein said ignitable material surrounds said frangible section, said initiating gas being directed radially outward towards said ignitable material upon breakage of said frangible section.

8. The inflator set forth in claim 1 further including said first housing portion having an axial end portion deformed inwardly and welded to said second housing portion.

9. The inflator set forth in claim 1 wherein said first housing portions comprises a pair of members fixed together, at least one of said members being cup-shaped.

10. The inflator set forth in claim 9 wherein both of said pair of members of said first housing portion are cup-shaped and are fixed together at a location between axially opposite ends of said first housing portion.

11. The inflator set forth in claim 1 wherein said second housing portion further includes a cylindrical body with openings for directing the combustion products into the toroidal chamber and openings for directing inflation fluid from the chamber to the flow path defined by said stop means.

12. The inflator set forth in claim 1 wherein said first housing portion has an axial extent which is greater than the axial extent of said second housing portion, the axial extent of said second housing portion is positioned within the axial extent of said first housing portion.

13. An inflator for inflating an air bag, said inflator comprising:

a housing defining a chamber for inflation fluid and having a central axis, said housing including a first housing portion and a second housing portion engaging and fixed to at least one of a pair of axially spaced annular surfaces of said first housing portion;

a flow passage extending through said second housing portion to permit the flow of inflation fluid from the chamber to a location outside said housing;

a closure member fixed to said second housing portion to block the flow of inflation fluid from the chamber to the flow passage when unruptured and to permit the flow of inflation fluid from the chamber to the flow passage when ruptured;

an actuatable initiator for generating an initiating gas upon actuation;

a casing having a base section fixed to one of said first and second housing portions and a movable section connected to said base section, said casing supporting said initiator, said movable section separating from said base section in response to actuation of said initiator to effect the rupture of said closure member;

an ignitable material supported by said casing for producing combustion products upon being ignited by said initiating gas to heat and pressurize the inflation fluid;

a cup located about said ignitable material;

a plurality of radial flow passages through which the combustion products can flow and which are defined by cooperating slots formed in said base section of said casing and in said cup; and stop means movable with said movable section of said casing for limiting movement of said movable section relative to said second housing portion and for defining a flow path through which inflation fluid can flow from said chamber to said flow passage in said second housing portion.

14. The inflator set forth in claim 13 wherein said cup further includes a clip for retaining said cup in a predetermined initial position relative to said base section of said casing prior to actuation of said initiator.

15. The inflator set forth in claim 13 further including a surface defining a recess in said second housing portion, the recess including said flow passage, said closure member extending across the recess, and one of said movable section of said casing and said cup having a portion extendable at least partially into the recess to rupture said closure member.

16. The inflator set forth in claim 13 wherein said stop means is formed on said cup as a plurality of axially extending shoulders.

17. The apparatus set forth in claim 13 further including a frangible section connecting said movable section of said casing to said base section and wherein said ignitable material surrounds said frangible section, said initiating gas being directed radially outward towards said ignitable material upon breakage of said frangible section.

18. An apparatus for use in inflating an air bag, said apparatus comprising:

a housing defining a substantially toroidal chamber for inflation fluid, said housing having a one-piece first housing portion and a second housing portion having one end fixed to an annular surface of said first housing portion and another end fixed to an axial end portion of said first housing portion;

a flow passage extending through said second housing portion for allowing inflation fluid flow between the toroidal chamber and an air bag;

a closure member fixed to said second housing portion for blocking inflation fluid flow between the toroidal chamber and the flow passage when unruptured and for permitting inflation fluid flow between the toroidal chamber and the flow passage when ruptured;

an actuatable initiator for generating an initiating gas upon actuation;

a casing having a base section fixed to said first housing portion and a movable section connected at a frangible section to said base section, said casing supporting said initiator, said movable section separating from said base section in response to actuation of said initiator to direct initiating gas radially outward;

an ignitable material surrounding said casing to produce combustion products upon being ignited by said initiating gas to heat and pressurize the inflation fluid;

a movable cup located about said ignitable material and having means for holding said cup in a predetermined initial position relative to said casing prior to ignition of said ignitable material, said cup being movable in response to ignition of said ignitable material, one of said cup and said movable section of said casing having a portion to rupture said closure member; and a stop on said cup to limit movement of said cup relative to said second housing portion and to define a flow path between said cup and said second housing portion.

19. The apparatus set forth in claim 18 further including radial flow passages through which the combustion products can flow and which are defined by cooperating slots formed in said base portion of said casing and in said cup, said cooperating slots being aligned when said cup moves.

20. An apparatus for use in inflating an air bag, said apparatus comprising:

a housing defining a substantially toroidal chamber for inflation fluid, said housing having a two-piece first housing portion and a second housing portion having one end fixed to an annular surface of said first housing portion, said first housing portion having an annular surface welded to another end of said second housing portion, said first housing portion includes at least one cup-shaped member;

a flow passage extending through said second housing portion for allowing inflation fluid flow between the toroidal chamber and an air bag;

a closure member fixed to said second housing portion for blocking inflation fluid flow between the toroidal chamber and the flow passage when unruptured and for permitting inflation fluid flow between the toroidal chamber and the flow passage when ruptured;

an actuatable initiator for generating an initiating gas upon actuation;

a casing having a base section fixed to said second housing portion and a movable section connected to said base section, said casing supporting said initiator, said movable section separating from said base section in response to actuation of said initiator to direct initiating gas radially outward to effect the rupture of said closure member after separation from the base section;

an ignitable material surrounding said casing to produce combustion products upon being ignited by said initiating gas to heat and pressurize the inflation fluid;

a movable cup located about said ignitable material and having means for holding said cup in a predetermined initial position relative to said casing prior to ignition of said ignitable material, one of said movable section of said casing and said cup having a portion to rupture said closure member; and a stop to limit movement of said cup relative to said second housing portion and to define a flow path between said cup and said second housing portion.

21. The apparatus set forth in claim 20 wherein said first housing portion includes a pair of cup-shaped members welded together.

22. The apparatus set forth in claim 20 further including radial flow passages through which the combustion products can flow and which are defined by cooperating slots formed in said base portion of said casing and in said cup, said cooperating slots being aligned when said cup moves.

23. A method of assembling an air bag inflator, said method comprising the steps of:

providing a first housing portion;

fixing a base portion of a casing to the first housing portion;

fixing an initiator in the casing;

placing an ignitable material in the casing to surround at least a portion of the casing;

placing a cup over the ignitable material;

attaching the cup to the casing;

providing a second housing portion with a flow passage to allow the flow of an inflation fluid through the second housing portion;

fixing a closure member to the second housing portion for blocking fluid flow through the flow passage when unruptured and for permitting fluid flow when ruptured;

attaching a first end of the second housing portion to a first end of the first housing portion; and attaching a second end of the first housing portion to a second end of the second housing portion to define a chamber for inflation fluid.

24. The method of claim 23 wherein said step of attaching a second end of the first housing portion to a second end of the second housing portion includes deforming the second end of the first housing portion inwardly and welding the second end of the first housing portion to the second end of the second housing portion.

25. The method of claim 23 wherein said step of attaching a second end of the first housing portion to a second end of the second housing portion includes providing a separate second end portion of the first housing portion and attaching the separate second end portion between and to both the first end of the first housing portion and the second end of the second housing portion.

26. The method set forth in claim 23 wherein said step of attaching a second end of the first housing comprises the step of attaching the first housing portion to the second housing portion to define a substantially toroidal chamber.

27. The method set forth in claim 23 wherein said step of attaching the cup comprises the step of clipping a resilient portion of the cup to the casing.

28. An apparatus for use in heating an inflation fluid in an air bag inflator, said apparatus comprising:

an actuatable initiator for generating an initiating gas upon actuation;

a casing having a base section attachable to a housing of an air bag inflator and a movable section connected to said base section, said casing supporting said initiator, said movable section being movable in a direction away from%said base section in response to actuation of said initiator to direct the initiating gas radially of said casing, said movable section effecting the flow of inflation fluid from the housing of the inflator after moving away from said base section;

an ignitable material located in said casing for producing combustion products upon being ignited by the initiating gas to effect movement of said movable section away from said base section and to heat and pressurize the inflation fluid, said ignitable material surrounding a portion of said casing at which said movable section is connected with said base section;

a movable cup located about said ignitable material and having means for holding said cup in a predetermined initial position relative to said casing prior to ignition of said ignitable material, said cup being movable in response to ignition of said ignitable material upon movement of said movable section of said casing from said base section of said casing; and radial flow passages through which the combustion products can flow and which are defined by cooperating slots formed in said base portion and in said cup, said cooperating slots being aligned when said cup moves.

29. The apparatus set forth in claim 28 further including a stop to limit movement of said cup and said movable section relative to the housing of the inflator and to at least partially define a flow path between said cup and the housing.

30. The apparatus set forth in claim 29 wherein said stop is formed on said cup as a plurality of axially extending shoulders.

31. The apparatus set forth in claim 28 wherein said cup further includes a portion to effect the flow of inflation fluid from the housing of the inflator.

32. The apparatus set forth in claim 28 wherein said movable section of said casing further includes a portion extending through an opening in said cup to effect the flow of inflation fluid from the housing of the inflator.

33. The apparatus set forth in claim 28 wherein said means on said cup includes a clip for holding said cup in a predetermined initial position relative to said base section of said casing prior to actuation of said initiator.

34. A method of assembling a heating device for air bag inflation fluid, said method comprising the steps of:

providing a casing;

fixing an initiator in the casing;

placing an ignitable material in the casing to surround a portion of the casing;

placing a cup over the ignitable material; and attaching the cup to the casing to form a closed chamber.

35. The method set forth in claim 34 wherein said step of attaching the cup comprises the step of clipping a resilient member of the cup to the casing.

36. The apparatus as set forth in claim 18 wherein said second housing portion is one-piece.

37. The apparatus as set forth in claim 20 wherein said second housing portion is one-piece.

* * * * *